(12) United States Patent
Honda

(10) Patent No.: US 11,597,380 B2
(45) Date of Patent: Mar. 7, 2023

(54) CONTROL DEVICE AND CONTROL METHOD FOR VEHICLE DRIVE UNIT

(71) Applicant: Toyota Jidosha Kabushiki Kaisha, Toyota (JP)

(72) Inventor: Kohei Honda, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/739,785

(22) Filed: May 9, 2022

(65) Prior Publication Data

US 2022/0388497 A1 Dec. 8, 2022

(30) Foreign Application Priority Data

Jun. 2, 2021 (JP) .............................. JP2021-093089

(51) Int. Cl.
*G06F 1/00* (2006.01)
*B60W 30/02* (2012.01)
*B60W 20/10* (2016.01)
*B60W 50/00* (2006.01)

(52) U.S. Cl.
CPC ............ *B60W 30/02* (2013.01); *B60W 20/10* (2013.01); *B60W 50/0097* (2013.01); *B60W 2510/10* (2013.01); *B60W 2520/105* (2013.01); *B60W 2710/0666* (2013.01); *B60W 2710/083* (2013.01)

(58) Field of Classification Search
CPC .. B60W 30/20; B60W 20/10; B60W 50/0097; B60W 2510/10; B60W 2520/105
See application file for complete search history.

(56) References Cited

U.S. PATENT DOCUMENTS

| 10,239,527 | B2 | 3/2019 | Hada |
| 10,586,454 | B2 | 3/2020 | Toyoda et al. |
| 10,692,369 | B2 | 6/2020 | Endo |
| 10,803,743 | B2 | 10/2020 | Abari et al. |
| 10,814,881 | B2 | 10/2020 | Liu et al. |
| 10,845,818 | B2 | 11/2020 | Kehl |
| 10,857,849 | B2 | 12/2020 | Toyoda |
| 10,908,609 | B2 | 2/2021 | Michalakis et al. |

(Continued)

FOREIGN PATENT DOCUMENTS

JP 2005119359 A 5/2005

*Primary Examiner* — John Kwon
(74) *Attorney, Agent, or Firm* — Dinsmore & Shohl LLP

(57) ABSTRACT

A control device for a vehicle drive unit is configured to control, based on an operating state of a vehicle, a vehicle drive unit having one or more power sources. The control device includes a processor and a storage device. The storage device is configured to store a vehicle front-rear acceleration prediction model being a machine learning model that receives as an input a command torque and outputs predicted acceleration. The processor is configured to: execute a predicted acceleration calculation process using the vehicle front-rear acceleration prediction model; and execute a command torque calculation process to calculate the command torque that minimizes an evaluation function. The evaluation function minimizes a deviation of the predicted acceleration with respect to a target vehicle front-rear acceleration according to a target torque based on the operating state while reducing a deviation of the command torque with respect to the target torque.

10 Claims, 8 Drawing Sheets

(56) References Cited

U.S. PATENT DOCUMENTS

| | | |
|---|---|---|
| 10,916,140 B2 | 2/2021 | Lu et al. |
| 10,930,153 B2 | 2/2021 | Morimura et al. |
| 10,933,880 B2 | 3/2021 | Vladimerou et al. |
| 11,110,932 B2 | 9/2021 | Hummelshøj |
| 11,117,575 B2 | 9/2021 | Irie et al. |
| 11,126,185 B2 | 9/2021 | McGill, Jr. et al. |
| 11,126,186 B2 | 9/2021 | McGill, Jr. et al. |
| 11,131,994 B2 | 9/2021 | Michalakis et al. |
| 11,138,465 B2 | 10/2021 | Ozog et al. |
| 11,182,652 B2 | 11/2021 | Guo et al. |
| 11,183,061 B2 | 11/2021 | Mason et al. |
| 11,256,986 B2 | 2/2022 | Tang et al. |
| 11,292,489 B2 | 4/2022 | Liu et al. |
| 11,294,388 B2 | 4/2022 | Yang et al. |
| 11,315,421 B2 | 4/2022 | Su et al. |
| 11,418,597 B2 | 8/2022 | Higuchi et al. |
| 11,433,923 B2 | 9/2022 | Shou et al. |
| 11,433,924 B2 | 9/2022 | Kataoka et al. |
| 11,447,129 B2 | 9/2022 | Mangalam et al. |
| 11,447,140 B2 | 9/2022 | Austin et al. |
| 2013/0013143 A1* | 1/2013 | Wang .................... G01M 17/06 |
| | | 701/31.6 |
| 2016/0153374 A1* | 6/2016 | Tashiro ............... F02D 41/0002 |
| | | 701/103 |
| 2018/0186360 A1* | 7/2018 | Jo .......................... B60W 40/09 |
| 2018/0257654 A1* | 9/2018 | Tashiro ................... F16D 48/02 |
| 2018/0297578 A1* | 10/2018 | Park ...................... B60W 20/40 |
| 2019/0001960 A1* | 1/2019 | Lee ....................... B60W 20/20 |
| 2020/0241530 A1 | 7/2020 | Caveney |
| 2021/0089890 A1 | 3/2021 | Tang et al. |

\* cited by examiner

CONTROL DEVICE AND CONTROL METHOD FOR VEHICLE DRIVE UNIT

CROSS-REFERENCE TO RELATED APPLICATION

The present disclosure claims priority under 35 U.S.C. § 119 to Japanese Patent Application No. 2021-093089, filed on Jun. 2, 2021, which is incorporated herein by reference in its entirety.

BACKGROUND

Technical Field

The present disclosure relates to a control device and a control method for a vehicle drive unit.

Background Art

JP 2005-119359 A discloses a vehicle control device applied to a vehicle equipped with a drive system having an internal combustion engine and a transmission. The vehicle control device includes control pattern selection means and control means. The control pattern selection means selects one output pattern from among multiple types of drive torque output patterns prepared in advance based on the detection results of detection means for detecting various state quantities related to the vehicle. The control means controls the internal combustion engine and the drive system based on the output pattern selected by the control pattern selection means.

SUMMARY

During acceleration or deceleration of a vehicle, vehicle front-rear vibration (vibration of vehicle front-rear acceleration) may be generated due to the torsion of a drive shaft of the vehicle, or may be generated due to the elimination of backlash of gears located in a power transmission path from one or more power sources of the vehicle to the drive shaft.

In order to achieve a good balance between vehicle front-rear vibration reduction and vehicle kinetic performance (i.e., responsiveness), the vehicle control device disclosed in JP 2005-119359 A has the multiple types of drive torque output patterns as described above. Also, these drive torque output patterns are set to be different depending on the detection result of various state quantities related to the vehicle. In this kind of torque control method disclosed in JP 2005-119359 A, many adaptive values may be needed depending on the operating state of the vehicle.

The present disclosure has been made in view of the problem described above, and an object of the present disclosure is to provide a control device and a control method for a vehicle drive unit which can achieve both the vehicle front-rear vibration reduction and vehicle acceleration and deceleration performance while reducing the number of adaptations of parameters used for vehicle drive torque control.

A control device for a vehicle drive unit according to an aspect of the present disclosure is configured to control, based on an operating state of a vehicle, a vehicle drive unit having one or more power sources. The control device includes a processor and a storage device. The storage device is configured to store a vehicle front-rear acceleration prediction model being a machine learning model that receives as an input a command torque, which is a vehicle drive torque commanded to the vehicle drive unit, and outputs predicted acceleration, which is a predicted value of vehicle front-rear acceleration. The processor is configured to: execute a predicted acceleration calculation process to calculate the predicted acceleration using the vehicle front-rear acceleration prediction model; and execute a command torque calculation process to calculate the command torque that minimizes an evaluation function. The evaluation function minimizes a deviation of the predicted acceleration with respect to a target vehicle front-rear acceleration according to a target torque being a target value of the vehicle drive torque based on the operating state while reducing a deviation of the command torque with respect to the target torque.

The processor may be configured to further execute an acceleration correction process to correct the predicted acceleration outputted from the vehicle front-rear acceleration prediction model, based on a difference of the predicted acceleration with respect to actual vehicle front-rear acceleration generated when the vehicle drive torque according to the command torque is outputted from the vehicle drive unit.

The processor may be configured to execute the predicted acceleration calculation process and the command torque calculation process for each time step for data of the target torque, the command torque, the target vehicle front-rear acceleration, and the predicted acceleration at a plurality of time steps included in a prediction period being a designated period from a current time step.

The prediction period may be a minimum period to predict at least one of vibration of actual vehicle front-rear acceleration caused by a torsion of a drive shaft of the vehicle and vibration of the actual vehicle front-rear acceleration caused by elimination of backlash of gears located in a power transmission path from the one or more power sources to the drive shaft.

The processor may be configured to cause the target torque at each of the plurality of time steps included in the prediction period to be constant at a value of the target torque at the current time step.

A control method for a vehicle drive unit according to another aspect of the present disclosure controls, based on an operating state of a vehicle, a vehicle drive unit having one or more power sources. The control method includes: a predicted acceleration calculation process to calculate a predicted acceleration, which is a predicted value of vehicle front-rear acceleration, using a vehicle front-rear acceleration prediction model being a machine learning model that receives as an input a command torque, which is a vehicle drive torque commanded to the vehicle drive unit, and outputs the predicted acceleration; and a command torque calculation process to calculate the command torque that minimizes an evaluation function. The evaluation function minimizes a deviation of the predicted acceleration with respect to a target vehicle front-rear acceleration according to a target torque being a target value of the vehicle drive torque based on the operating state while reducing a deviation of the command torque with respect to the target torque.

According to the control device or the control method for a vehicle drive unit of the present disclosure, the command torque that minimizes the evaluation function is calculated. This evaluation function minimizes the deviation of the predicted acceleration with respect to the target vehicle front-rear acceleration. Therefore, according to the command torque that minimizes the evaluation function, the vehicle front-rear vibration can be reduced satisfactorily. Then, the predicted acceleration used to calculate this command torque is calculated using the vehicle front-rear acceleration prediction model, which is a machine learning model. As a result, it is possible to reduce the number of adaptive values used for vehicle drive torque control. Moreover, according to the evaluation function, the command torque that not only minimizes the deviation of the predicted acceleration with respect to the target vehicle front-rear acceleration but also reduces the deviation of the command torque with respect to the target torque is calculated. Therefore, the command torque can be determined so as to favorably satisfy the target torque while reducing the vehicle front-rear vibration. Thus, according to the control device or the control method of the present disclosure, it is possible to achieve both the vehicle front-rear vibration reduction and the vehicle acceleration and deceleration performance while reducing the number of adaptations of parameters used for the vehicle drive torque control.

DETAILED DESCRIPTION

It is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment 1-1. Example of System Configuration of Vehicle

Figure 1:
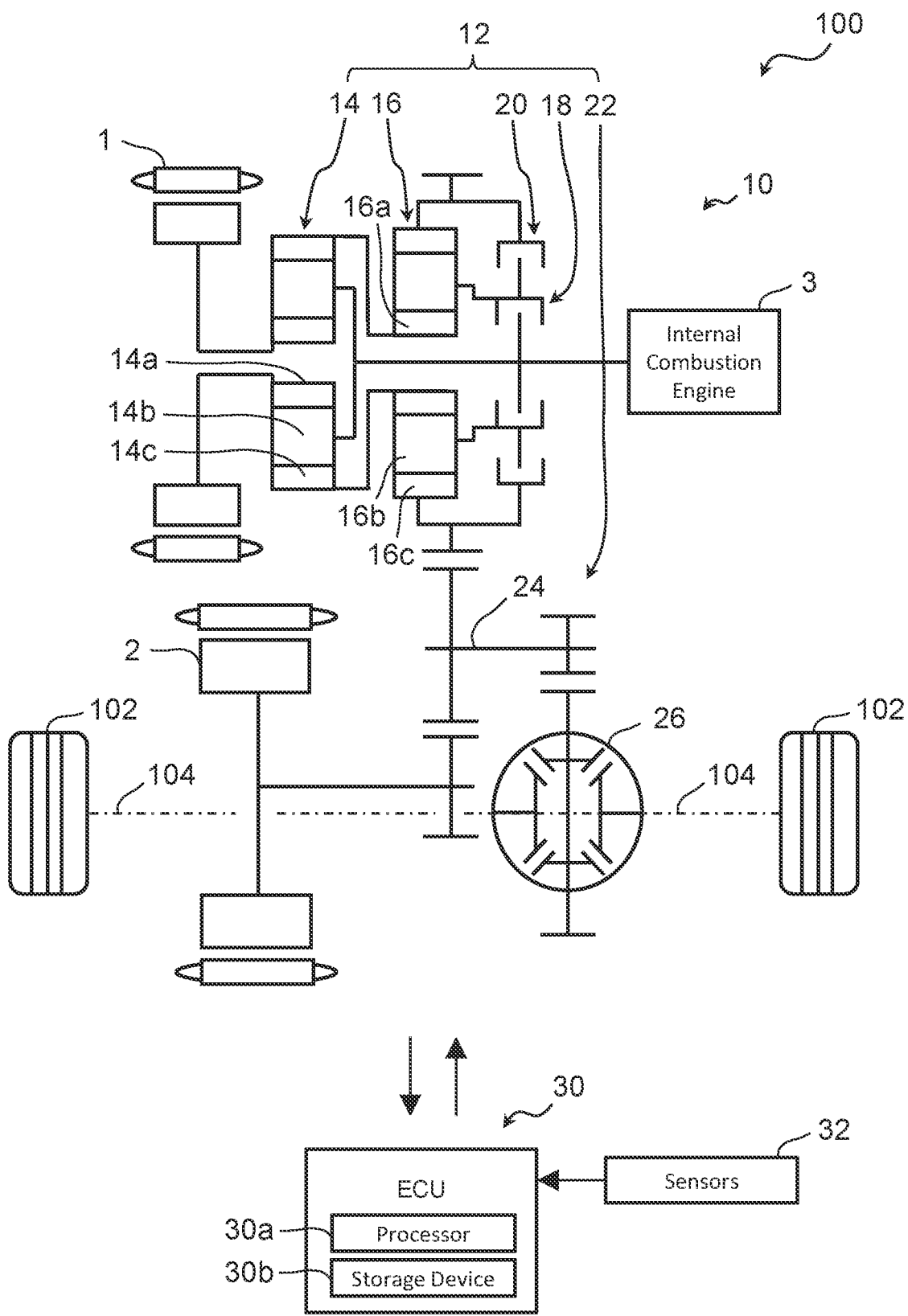
FIG. 1 is a diagram showing an example of a system configuration of a vehicle on which a vehicle drive unit according to a first embodiment is mounted.

FIG. 1 is a diagram showing an example of a system configuration of a vehicle 100 on which a vehicle drive unit 10 according to a first embodiment is mounted. The vehicle 100 includes a vehicle drive unit 10. The vehicle drive unit 10 is configured to drive the vehicle 100 (wheels 102). The vehicle drive unit 10 includes a first motor generator (MG) 1, a second motor generator (MG) 2, and an internal combustion engine 3 as its power sources. The MG 1 is mainly used as a generator, and the MG 2 is mainly used as an electric motor for driving the wheels 102. Also, the vehicle drive unit 10 includes a power split device 12 as an example.

The power split device 12 includes a first planetary gear unit 14, a second planetary gear unit 16, a low-speed clutch 18, a high-speed clutch 20, and a reduction mechanism 22. The first planetary gear unit 14 includes a first sun gear 14a, a first carrier 14b, and a first ring gear 14c. The second planetary gear unit 16 includes a second sun gear 16a, a second carrier 16b, and a second ring gear 16c. The first sun gear 14a is connected to the MG 1, and the first carrier 14b is connected to the internal combustion engine 3. The first ring gear 14c is coupled to the second sun gear 16a.

The low-speed clutch 18 is configured such that the second sun gear 16a and the second carrier 16b can be connected to each other. The high-speed clutch 20 is configured such that the second carrier 16b and the second ring gear 16c can be connected to each other. The reduction mechanism 22 includes a counter shaft (hereinafter, also referred to as a "peller shaft") 24 and a differential gear 26. The peller shaft 24 is parallel to both the rotational axis of the second ring gear 16c and the rotating shaft 2a of the MG 2. The peller shaft 24 is connected via gears to each of the second ring gear 16c and the MG 2. That is, the peller shaft 24 is arranged such that the torque of the MG 2 can be added to the torque from the second ring gear 16c (mainly, the torque from the internal combustion engine 3). Furthermore, the peller shaft 24 is coupled to the differential gear 26 via gears. Therefore, the torque from the second ring gear 16c, and the torque of the MG 2 are transmitted to the wheels 102 via the reduction mechanism 22 and drive shafts 104. It should be noted that the differential gear 26 may or may not be built into the vehicle drive unit 10.

According to the vehicle drive unit 10 described above, it is possible to change the speed by controlling the engagement/disengagement of the clutches 18 and 20. Specifically, the driving mode of the vehicle drive unit 10 includes a high-speed mode suitable for high-speed time of the vehicle 100, and a low-speed mode suitable for low-speed time. According to the power split device 12, the high-speed mode can be selected by engaging the high-speed clutch 20 while releasing the low-speed clutch 18, and the low-speed mode can be selected by engaging the low-speed clutch 18 while releasing the high-speed clutch 20.

As described above, the vehicle 100 is a hybrid electric vehicle including the power split type vehicle drive unit 10 as an example. However, the "vehicle" according to the present disclosure may be a hybrid electric vehicle including a vehicle drive unit of a type other than the power split type. Also, the vehicle may be, for example, a vehicle including a vehicle drive unit having only one or more electric motors as its power source (e.g., a battery electric vehicle or a fuel cell electric vehicle), or a vehicle including a vehicle drive unit having only an internal combustion engine as its power source.

Furthermore, the vehicle 100 includes an electronic control unit (ECU) 30. The ECU 30 is a computer configured to execute various processes relating to the vehicle 100, and corresponds to a "control device" configured to control the vehicle drive unit 10. Specifically, the processes executed by the ECU 30 include processes relating to the control of each of the MG 1, the MG 2 and the internal combustion engine 3, and also processes relating to the control (speed change control) of the clutches 18 and 20. The ECU 30 includes a processor 30a and a storage device 30b. The processor 30a reads and executes a program stored in the storage device 30b. As a result, the above-described various processes by the processor 30a are realized. A plurality of ECUs may be provided as the ECU 30. For example, the ECU 30 may be configured to include: an ECU for collectively controlling the vehicle drive unit 10; ECUs for controlling the respective MG 1 and MG 2; an ECU for controlling the internal combustion engine 3; and an ECU for controlling the clutches 18 and 20.

The ECU 30 receives sensor signals from sensors 32 used in the various processes described above. The sensors 32 mentioned here include, for example, a vehicle acceleration sensor, a vehicle speed sensor, an accelerator position sensor, a rotation speed sensor for the MG 1, a rotation speed sensor for the MG 2, a crank angle sensor, and a shift position (vehicle speed mode) sensor. Also, the storage device 30b stores a vehicle front-rear acceleration prediction model 38, which will be described below with reference to FIG. 2.

1-2. Vehicle Drive Torque Control

Figure 2:
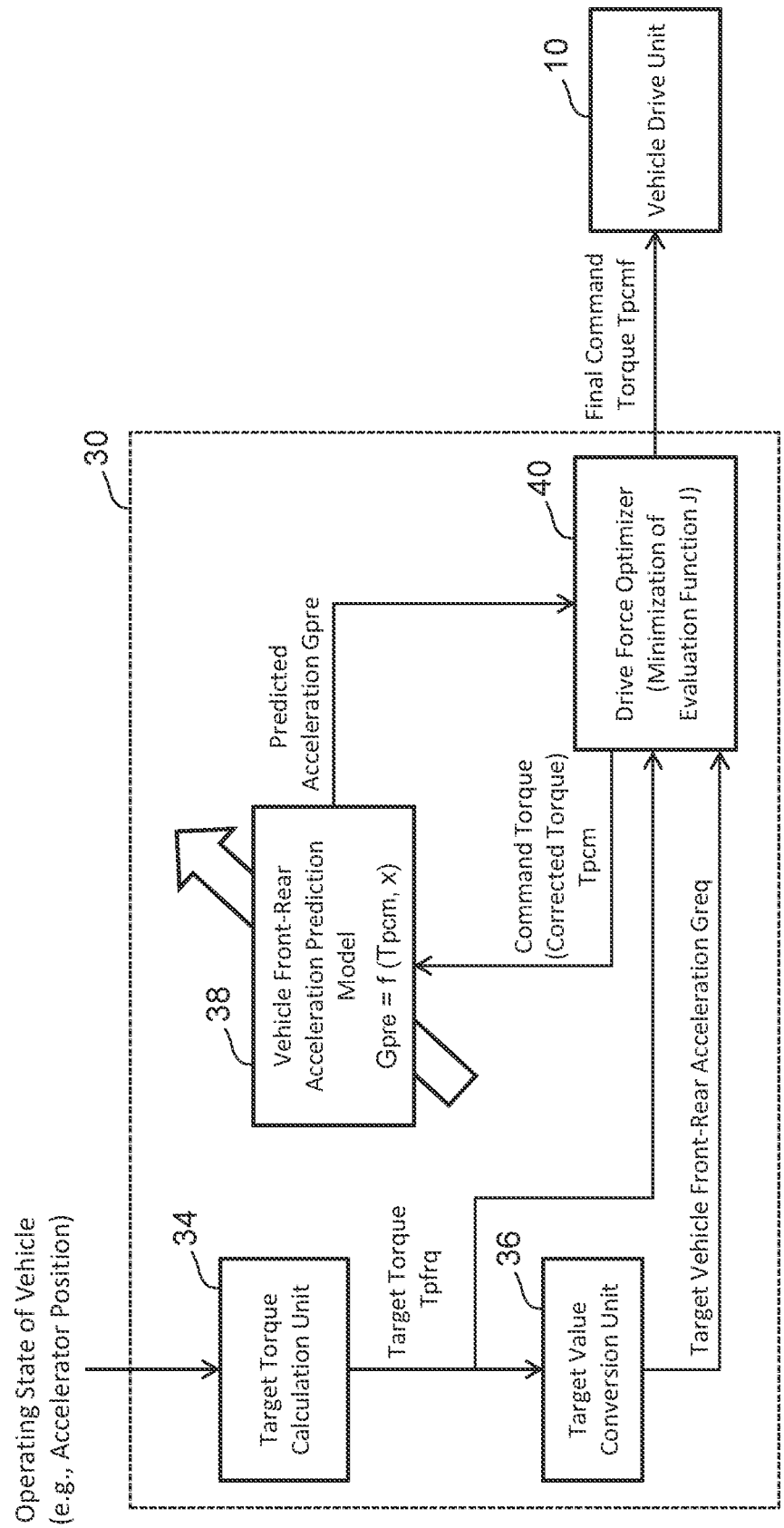
FIG. 2 is a block diagram showing the outline of a control structure of vehicle drive torque according to the first embodiment.

FIG. 2 is a block diagram showing the outline of a control structure of vehicle drive torque according to the first embodiment. The ECU 30 performs "vehicle drive torque control" to drive the vehicle 100. FIG. 2 shows a functional configuration of the ECU 30 associated with this vehicle drive torque control. The ECU 30 includes a target torque calculation unit 34, a target value conversion unit 36, a vehicle front-rear acceleration prediction model 38, and a drive force optimizer 40. These target torque calculation unit 34, target value conversion unit 36, vehicle front-rear acceleration prediction model 38, and drive force optimizer 40 are realized by software when a program stored in the storage device 30b is executed by the processor 30a.

The vehicle drive torque subject to the vehicle drive torque control according to the first embodiment is, for example, the torque of the peller shaft 24 (peller shaft torque) Tp. Hereinafter, a target value (i.e., request value) of the peller shaft torque Tp is referred to as a "target torque Tpfrq". Also, "command torque" which is a vehicle drive torque commanded to the vehicle drive unit 10 is, for example, a "command torque Tpcm" which is a command value of the peller shaft torque Tp.

Additionally, the "vehicle drive torque" used in the vehicle drive torque control is not limited to the peller shaft torque Tp (i.e., the torque on the input side of the differential gear 26) as long as it is used uniformly within the vehicle drive torque control. That is, for example, the torque after final deceleration by the differential gear 26 (i.e., the torque of the drive shaft 104) may be used as the vehicle drive torque.

The target torque calculation unit 34 calculates the target torque Tpfrq. The target torque Tpfrq can be calculated, for example, as follows. That is, the target torque calculation unit 34 calculates a peller shaft rotation speed based on the accelerator position (accelerator depression amount) of the vehicle 100 and the vehicle speed. Then, the target torque calculation unit 34 calculates the target torque Tpfrq according to the accelerator position, the peller shaft rotation speed, and the shift position from a map (not shown) that defines the relationship of the target torque Tpfrq with respect to the accelerator position, the peller shaft rotation speed, and the shift position. The accelerator position, the vehicle speed, and the shift position used to calculate the target torque Tpfrq are obtained using, for example, the sensors 32 described above.

The target torque Tpfrq calculated by the target torque calculation unit 34 is inputted to the target value conversion unit 36 and the drive force optimizer 40. The target value conversion unit 36 calculates a "target vehicle front-rear acceleration (or simply "target acceleration") Greq" which is a target value (request value) of the vehicle front-rear acceleration G. A specific calculation method of the target acceleration Greq will be described below with reference to FIG. 3. The target acceleration Greq calculated by the target value conversion unit 36 is inputted to the drive force optimizer 40.

The vehicle front-rear acceleration prediction model (or simply "acceleration prediction model") 38 is configured to predict a vehicle front-rear acceleration G generated in the vehicle 100 when a command torque Tpcm is commanded to the vehicle drive unit 10. That is, the acceleration prediction model 38 is a machine learning model constructed using the command torque Tpcm as an input and a "predicted acceleration Gpre" as an output. The predicted acceleration Gpre is a predicted value of the vehicle front-rear acceleration G. Specifically, the command torque Tpcm which is outputted from the drive force optimizer 40 is inputted to the acceleration prediction model 38. Moreover, one or more variables x indicating the operating state of the vehicle 100 are inputted to the acceleration prediction model 38 together with the command torque Tpcm. The one or more variables x are, for example, the torque of the MG 2 and the vehicle speed.

The acceleration prediction model 38 is constructed using, for example, a deep neural network. The learning of the acceleration prediction model 38 is performed in advance using the learning data which is a combination of "time series data of the command torque Tpcm and one or more variables x, which are explanatory variables (i.e., the inputs)", and "time series data of the vehicle front-rear acceleration G (more specifically, actual vehicle front-rear acceleration Gact), which is the objective variable (i.e., the output)". The learning data is acquired for a designated data acquisition period during acceleration and deceleration of the vehicle 100. In addition, the acceleration prediction model 38 is constructed to be updatable on the vehicle 100.

Additionally, the learning data is acquired by actually using the vehicle 100 including the vehicle drive unit 10. Therefore, the acceleration prediction model 38 is constructed as a machine learning model that is well adapted to the characteristics of the vehicle 100. Thus, according to the "vehicle front-rear acceleration prediction model" according to the present disclosure, it becomes possible to perform the prediction of the vehicle front-rear acceleration G according to the inputted command torque while satisfactorily reflecting the characteristics of the vehicle used for acquiring the learning data.

The predicted acceleration Gpre predicted by the acceleration prediction model 38 is inputted to the drive force optimizer 40 together with the target torque Tp and the target acceleration Greq. Upon receiving these inputs, the drive force optimizer 40 calculates a command torque Tpcm that minimizes an evaluation function J (see FIG. 3 below).

When the command torque Tpcm calculated by the drive force optimizer 40 is inputted to the acceleration prediction model 38, the acceleration prediction model 38 calculates the latest predicted acceleration Gpre according to the latest command torque Tpcm which is inputted, and outputs the latest predicted acceleration Gpre to the drive force optimizer 40. If the value of the evaluation function J does not meet a designated optimality criteria, the drive force optimizer 40 repeatedly calculates (i.e., corrects) the command torque Tpcm while receiving the latest predicted acceleration Gpre from the acceleration prediction model 38. If, on the other hand, the value of the evaluation function J meets the optimality criteria, the drive force optimizer 40 outputs (i.e., commands) the latest command torque (i.e., a corrected torque) Tpcm to the vehicle drive unit 10 as a command value of the final peller shaft torque Tp (a final command torque Tpcmf).

In the vehicle 100, when the target torque Tp is given to the vehicle drive unit 10 at the time of acceleration or deceleration, vehicle front-rear vibration caused by the torsion of the drive shaft 104 may be generated, and also vehicle front-rear vibration caused by the elimination of backlash of gears of each portion of the vehicle drive unit 10 may be generated. In order to evaluate the waveform of this kind of vehicle front-rear vibration (more specifically, the vibration of the vehicle front-rear acceleration G), it is necessary to acquire the waveform (more specifically, time series data) of the predicted acceleration Gpre. Hereinafter, the period for acquiring the waveform (time series data) of the predicted acceleration Gpre is referred to as a "prediction period tp". The prediction period tp (for example, see FIG. 4 described below) is a designated period from the current time step.

In order to secure the prediction accuracy of the predicted acceleration Gpre and reduce the calculation load necessary for the prediction, it is favorable that the prediction period tp is short. On the other hand, in order to appropriately evaluate the waveform of the vehicle front-rear vibration, it is necessary to acquire the time series data of the predicted acceleration Gpre of at least half cycle of the vehicle front-rear vibration. The reason is that the amplitude of the vehicle front-rear vibration can be acquired. Then, in order to acquire the time series data for the predicted acceleration Gpre of the half cycle of the vehicle front-rear vibration, a prediction period tp of 0.3 seconds or more is needed. Therefore, in the first embodiment, 0.3 seconds is used as an example of the prediction period tp. It should be noted that a prediction period tp longer than 0.3 seconds may be used.

For the reasons described above, in the first embodiment, the target acceleration Greq, the command torque Tpcm, and the predicted acceleration Gpre in the vehicle drive torque control shown in FIG. 2 is acquired as time series data for the prediction period tp as described in detail below with reference to FIG. 3.

Figure 3:
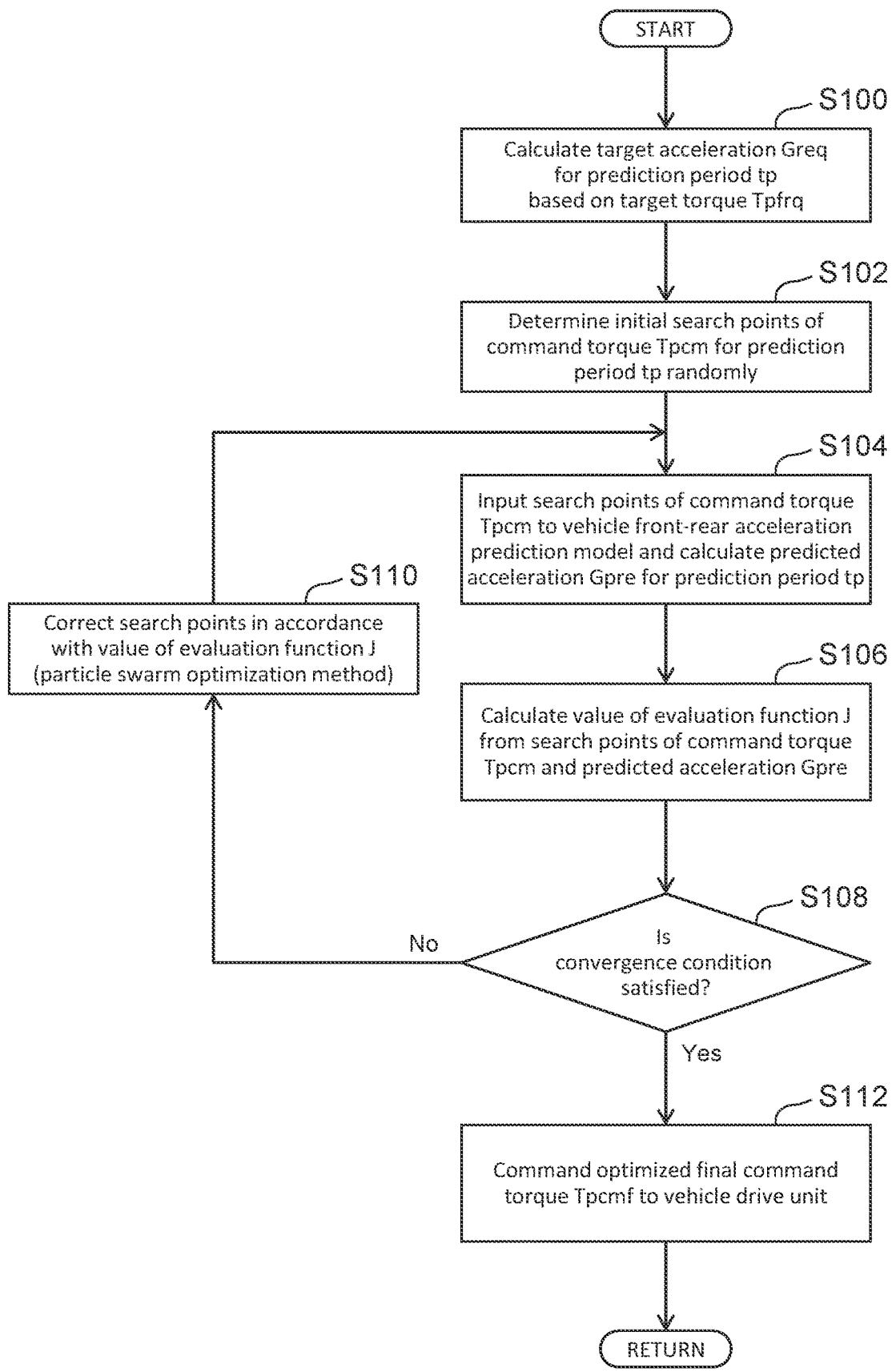
FIG. 3 is a flowchart showing an example of the flow of processing relating to vehicle drive torque control according to the first embodiment.

Next, FIG. 3 is a flowchart showing an example of the flow of processing relating to the vehicle drive torque control according to the first embodiment. The processing of this flowchart is repeatedly executed at a designated control cycle (in other words, at each time step) during operation of the vehicle 100. Thus, the prediction period tp progresses by one time step for each time step.

In FIG. 3, first, in step S100, the ECU 30 (processor 30a) calculates a target vehicle front-rear acceleration (target acceleration) Greq for the prediction period tp on the basis of the target torque Tpfrq. This step S100 corresponds to the processing of the target value conversion unit 36.

Figure 4:
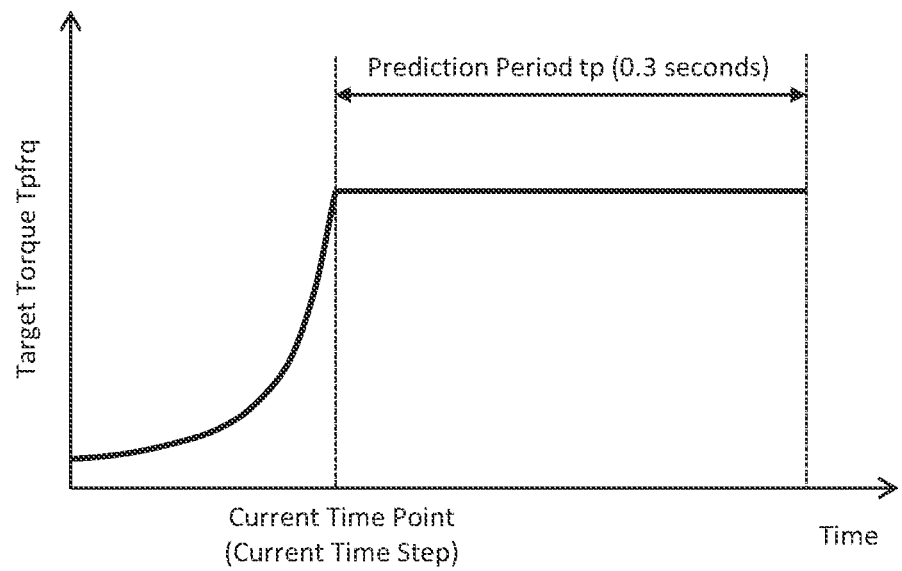
FIG. 4 is a time chart used to describe the method of predicting a target torque Tpfrq during a prediction period tp.

FIG. 4 is a time chart used to describe the method of predicting the target torque Tpfrq during the prediction period tp. It should be noted that FIG. 4 shows a waveform of the target torque Tpfrq at the time of acceleration. The waveform of the target torque Tpfrq at the time of deceleration is inverted from that shown in FIG. 4 in positive and negative directions.

As shown in FIG. 4, the target torque Tpfrq which is the basis for the calculation of the target acceleration Greq for the prediction period tp in step S100 is predicted to be constant at the current time value (at the current time-step value). As described above, in the calculation of the target torque Tpfrq in the target torque calculation unit 34, the accelerator position, the vehicle speed, the peller shaft rotation speed, and the shift position, which are parameters indicating the operating state of the vehicle 100, are used. By supposing that the target torque Tpfrq in the prediction period tp is constant and continuous, the target torque Tpfrq in the prediction period tp can be acquired without the need to predict the parameters such as the accelerator position in the prediction period tp. That is, this technique does not need to predict a driver's accelerator pedal operation during the prediction period tp.

In step S100, the target acceleration Greq can be calculated using the following Equation (1) based on the equation of motion of the vehicle 100 subject to the vehicle drive torque control.

$$G_{req} = \frac{1}{9.81} \times \frac{(T_{pfrq\_d} \times DR \div r) - RL}{VM} \qquad (1)$$

In the calculation of the target acceleration Greq using Equation (1), the target torque Tpfrq is not used as it is, but a target torque Tpfrq_d after being converted as follows is used. The target value conversion unit 36 is configured to include the following torque prediction model, for example. This torque prediction model is configured to predict the response characteristics of the peller shaft torque Tp by simulating communication delay, dead time, and first order lag. The target torque Tpfrq_d is calculated by inputting the target torque Tpfrq at the current time into this kind of torque prediction model. Also, in Equation (1), a final reduction gear ratio DR of the differential gear 26, a tire radius r of the wheel 102, and a vehicle weight VM are known. A travel resistance RL is calculated or detected separately. A numerical value "9.81" in Equation (1) is the gravitational acceleration.

Figure 5:
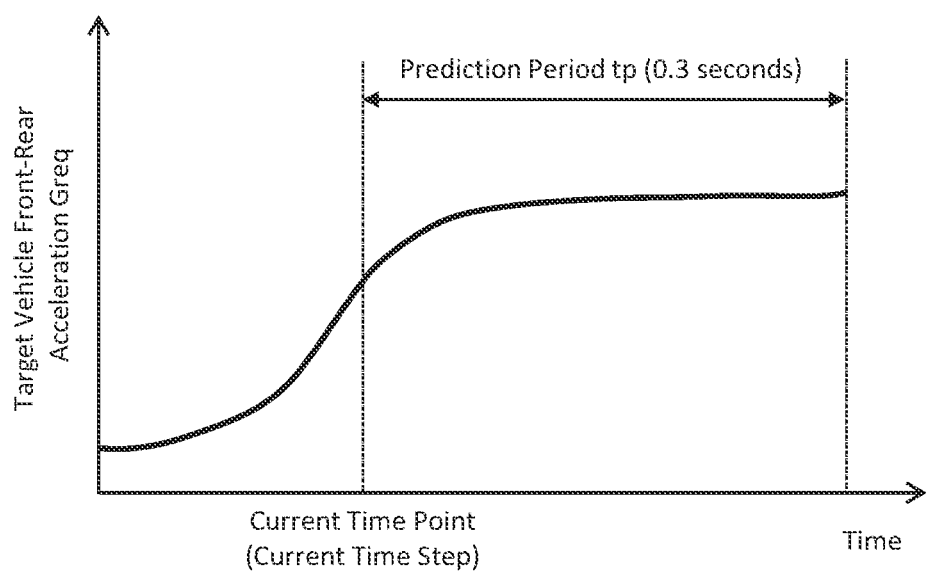
FIG. 5 is a time chart illustrating an example of target vehicle front-rear acceleration Greq for the prediction period tp calculated by a target value conversion unit shown in FIG. 2.

FIG. 5 is a time chart illustrating an example of the target vehicle front-rear acceleration Greq for the prediction period tp calculated by the target value conversion unit 36 shown in FIG. 2. In step S100, by substituting the target torque Tpfrq_d after being converted as described above into Equation (1), the waveform (i.e., time series data) of the target acceleration Greq for the prediction period tp is calculated as shown in FIG. 5. It should be noted that FIG. 5 shows the waveform of the target acceleration Greq at the time of acceleration, and the waveform of the target acceleration Greq at the time of deceleration is inverted from that shown in FIG. 5 in positive and negative directions.

The processing of step S102 following step S100 corresponds to the processing of the drive force optimizer 40. In step S102, the ECU 30 randomly determines search initial points of the command torque Tpcm in the prediction period tp using random numbers. If the control cycle is, for example, 20 milliseconds, the prediction period tp of 0.3 seconds will include 15 time steps following the current time step. Therefore, in this step S102, fifteen values of the command torque Tpcm are determined as the search initial points of the command torque Tpcm in the prediction period tp. These values of the command torque Tpcm are determined within designated upper and lower limits. In addition, the upper limit is, for example, a value of the target torque Tpfrq treated as a constant value in step S100.

The processing of step S104 following step S102 corresponds to the processing of the drive force optimizer 40 and the processing of the acceleration prediction model 38. The latter processing corresponds to an example of the "predicted acceleration calculation process" according to the present disclosure.

Specifically, in step S104, the ECU 30 (drive force optimizer 40) inputs, to the acceleration prediction model 38, the search initial points determined in step S102 or search points corrected in step S110 described below. The ECU 30 (acceleration prediction model 38) generates (calculates) the time series data of the predicted acceleration Gpre in the prediction period tp according to the inputted search initial points or the search points after correction (i.e., according to the time series data of the command torque (corrected torque) Tpcm in the prediction period tp). The time series data of the generated predicted acceleration Gpre is inputted to the drive force optimizer 40.

The processing of step S106 following step S104 corresponds to the processing of the drive force optimizer 40. In step S106, the ECU 30 calculates a value of the evaluation function J using the target torque Tpfrq (constant value), the target acceleration Greq (time series data), and the predicted acceleration Gpre (time series data) in the prediction period tp.

The evaluation function J is an evaluation function for minimizing the deviation of the predicted acceleration Gpre with respect to the target acceleration Greq while reducing the deviation of the command torque Tpcm (search point) with respect to the target torque Tpfrq (constant value) based on the operating state of the vehicle 100, and is formulated as expressed by the following Equation (2).

$$J = \int_{t_0}^{t_h} \left\{ \frac{w_t}{2} (T_{pfrq} - T_{pcm}(t))^2 + \frac{w_g}{2} (G_{req}(t) - G_{pre}(t))^2 \right\} dt \quad (2)$$

In Equation (2), "t" is time, and "$w_t$" and "$w_g$" are weights and freely set. The right-hand side of Equation (2) is the definite integral of the sum of the product of the square of the deviation of the command torque Tpcm (t) with respect to the target torque Tpfrq (constant value) and $w_t/2$, and the product of the square of the deviation of the predicted acceleration Gpre (t) with respect to the target acceleration Greq (t) and $w_g/2$. A period from a time point $t_0$ to a time point $t_h$ that specify the integration interval of Equation (2) corresponds to the prediction period tp described above. In addition, according to Equation (2), by adjusting the magnitudes of the weights $w_t$ and $w_g$, the degree of influence of each of the above two deviations on the minimization of the evaluation function J can be freely set.

The processing of steps S108 and S110 following step S106 corresponds to the processing of the drive force optimizer 40. The processing of these steps S108 and S110 is performed in accordance with the algorithm of the particle swarm optimization method, which is one of the specific methods for the optimization (minimization) of the drive force (i.e., command torque Tpcm) performed by the drive force optimizer 40. It should be noted that other optimization methods such as a shooting method may be used for the optimization.

In step S108, the ECU 30 determines whether or not a convergence condition of the evaluation function J to the optimum solution is satisfied. More specifically, the ECU 30 determines whether or not the value of the evaluation function J calculated in step S106 satisfies a reference value for optimality (for example, the absolute value of the evaluation function J) derived by the particle swarm optimization method.

When the convergence condition is not satisfied in step S108, the processing proceeds to step S110. In step S110, the ECU 30 corrects the search points (i.e., the time series data of the command torque Tpcm in the prediction period tp) in accordance with the value of the evaluation function J calculated in step S106. More specifically, in the example using the particle swarm optimization method, the coordinates of the search points after correction are calculated in accordance with the algorithm of the particle swarm optimization method.

After the search points are corrected in step S110, the processing returns to step S104. The ECU 30 (drive force optimizer 40) repeatedly executes the processing of steps S104, S106 and S110 while the convergence condition of step S108 is not satisfied. As a result, the value of the evaluation function J gradually decreases.

When, on the other hand, the convergence condition is satisfied in step S108, that is, when a command torque (corrected torque) Tpcm that minimizes the evaluation function J is calculated, the processing proceeds to step S112. In step S112, the ECU 30 (drive force optimizer 40) outputs (commands), to the vehicle drive unit 10 as a final command torque Tpcmf, a value of the command torque Tpcm at the next time step included in the time series data of the latest (i.e., optimized) command torque Tpcm.

Additionally, the processing of steps S102 to S110 (however, excluding the processing of the acceleration prediction model 38 included in step S104) corresponds to an example of the "command torque calculation process" according to the present disclosure.

1-3. Effect

As described above, the control structure of the vehicle drive torque according to the first embodiment is configured by combining the vehicle front-rear acceleration prediction model 38 and the drive force optimizer 40 (see FIG. 2). Specifically, according to the vehicle drive torque control, the command torque Tpcm that minimizes the evaluation function J is calculated. This evaluation function J minimizes the deviation (acceleration deviation) of the predicted acceleration Gpre with respect to the target acceleration Greq. More specifically, the waveform of the target acceleration Greq is not vibrated as shown in FIG. 5. Therefore, when the above-described acceleration deviation included in the evaluation function J is reduced, the vehicle front-rear vibration (i.e., vibration of the vehicle front-rear acceleration G) is reduced. Thus, according to the command torque Tpcm that minimizes the evaluation function J, it is possible to satisfactorily reduce the vehicle front-rear vibration. Then, the predicted acceleration Gpre used for calculating this command torque Tpcm is calculated using the acceleration prediction model 38 which is a machine learning model. Therefore, it is possible to significantly reduce the number of adaptative values used for the vehicle drive torque control.

Moreover, the evaluation function J is set so as to be able to calculate a command torque Tpcm that can reduce not only the acceleration deviation of the predicted acceleration Gpre with respect to the target vehicle front-rear acceleration Greq but also the deviation (torque deviation) of the command torque Tpcm with respect to the target torque Tpfrq. Therefore, it becomes possible to determine the command torque Tpcm (more specifically, the final command torque Tpcmf) so as to favorably satisfy the target torque Tpfrq while reducing the vehicle front-rear vibration.

Therefore, according to the vehicle drive torque control of the first embodiment, it becomes possible to achieve both the vehicle front-rear vibration reduction and the vehicle acceleration and deceleration performance while reducing the number of adaptations of parameters related to the vehicle drive torque control. In addition, according to the evaluation function J (see Equation (2)), by adjusting the magnitudes of the weights $w_t$ and $w_g$, it is possible to adjust the balance between reducing the vehicle front-rear vibration and ensuring the vehicle acceleration and deceleration performance.

Moreover, in the vehicle drive torque control according to the first embodiment, the calculation of the predicted acceleration Gpre by the acceleration prediction model 38 (the predicted acceleration calculation process), and, the calculation of the command torque Tpcm by the drive force optimizer 40 (the command torque calculation process) are executed, for each time step, for the data of the target torque Tpfrq, the command torque Tpcm, the target vehicle front-rear acceleration Greq, and the predicted acceleration Gpre at a plurality of time steps included in the prediction period tp which is a designated period from the current time step. As a result, it becomes possible to calculate the command torque Tpcm while evaluating the predicted acceleration Gpre by using the waveform of the predicted acceleration Gpre (time series data).

Furthermore, the prediction period tp is set as the minimum period (more specifically, a period corresponding to the half cycle of the vehicle front-rear vibration (for example, 0.3 seconds)) which is necessary to predict the vehicle front-rear vibration caused by the torsion of the drive shaft 104 and the vehicle front-rear vibration caused by the elimination of backlash of the gears of the vehicle drive unit 10. Thus, by setting the prediction period tp as short as possible, it becomes possible to calculate the command torque Tpcm (more specifically, the final command torque Tpcmf) that can achieve both the vehicle front-rear vibration and the vehicle acceleration and deceleration performance while ensuring the accuracy of the prediction and reducing the computational load for the prediction. It should be noted that the "prediction period" according to the present disclosure may be a minimum period necessary to predict "any one" of the vibration of the actual vehicle front-rear acceleration caused by the torsion of a drive shaft, and the vibration of the actual vehicle front-rear acceleration caused by the elimination of backlash of gears located in a power transmission path from one or more power sources to the drive shaft.

Moreover, in the present embodiment, the target torque Tpfrq at each of a plurality of time steps included in the prediction period tp is constant at the value of the target torque Tpfrq at the current time step (i.e., the starting point of the prediction period tp). Instead of this kind of example, the target torque Tpfrq for the prediction period tp may be calculated while predicting parameters for calculating the target torque Tpfrq for the prediction period tp, such as a driver's accelerator pedal operation in the prediction period tp, in any manner. In contrast, by predicting the target torque Tpfrq for the prediction period tp as a constant value as in the first embodiment, the target torque Tpfrq for the prediction period tp can be set without the need to predict parameters such as a driver's accelerator pedal operation. This also leads to a reduction in the adaptive values used for the vehicle drive torque control.

2. Second Embodiment

A second embodiment is different from the first embodiment in the control structure of the vehicle drive torque described below.

Figure 6:
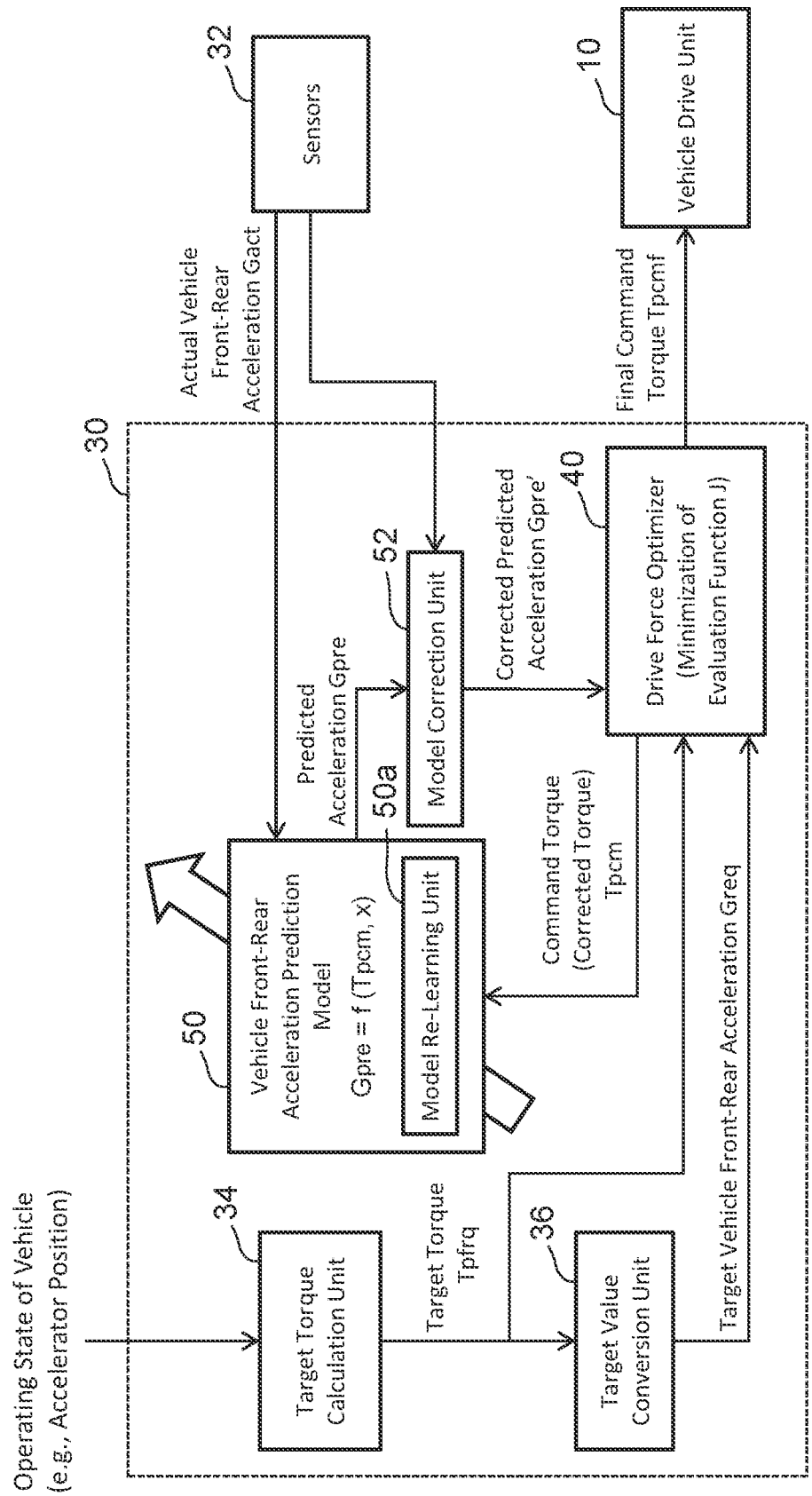
FIG. 6 is a block diagram showing the outline of a control structure of the vehicle drive torque according to a second embodiment.

FIG. 6 is a block diagram showing the outline of a control structure of the vehicle drive torque according to the second embodiment. The control structure shown in FIG. 6 is different from the control structure according to the first embodiment (see FIG. 2) in that an acceleration prediction model 50 is included in place of the acceleration prediction model 38 and a model correction unit 52 is additionally included.

Specifically, the acceleration prediction model 50 is the same as the acceleration prediction model 38 except that a model re-learning unit 50a is included.

The model correction unit 52 (processor 30a) corrects the predicted acceleration Gpre outputted from the acceleration prediction model 50, based on the difference in the predicted acceleration Gpre with respect to the actual vehicle front-rear acceleration (hereinafter, simply referred to as the "actual acceleration") Gact generated when the peller shaft torque Tp according to the command torque Tpcm (more specifically, the final command torque Tpcmf) is outputted from the vehicle drive unit 10. After this kind of correction of the predicted acceleration Gpre is performed, the model correction unit 52 outputs a corrected predicted acceleration Gpre' to the drive force optimizer 40 instead of the predicted acceleration Gpre which is the output of the acceleration prediction model 50. This correction corresponds to an example of the "acceleration correction process" according to the present disclosure. The actual acceleration Gact is detected by a vehicle acceleration sensor (G sensor) included in the sensors 32.

Figure 7:
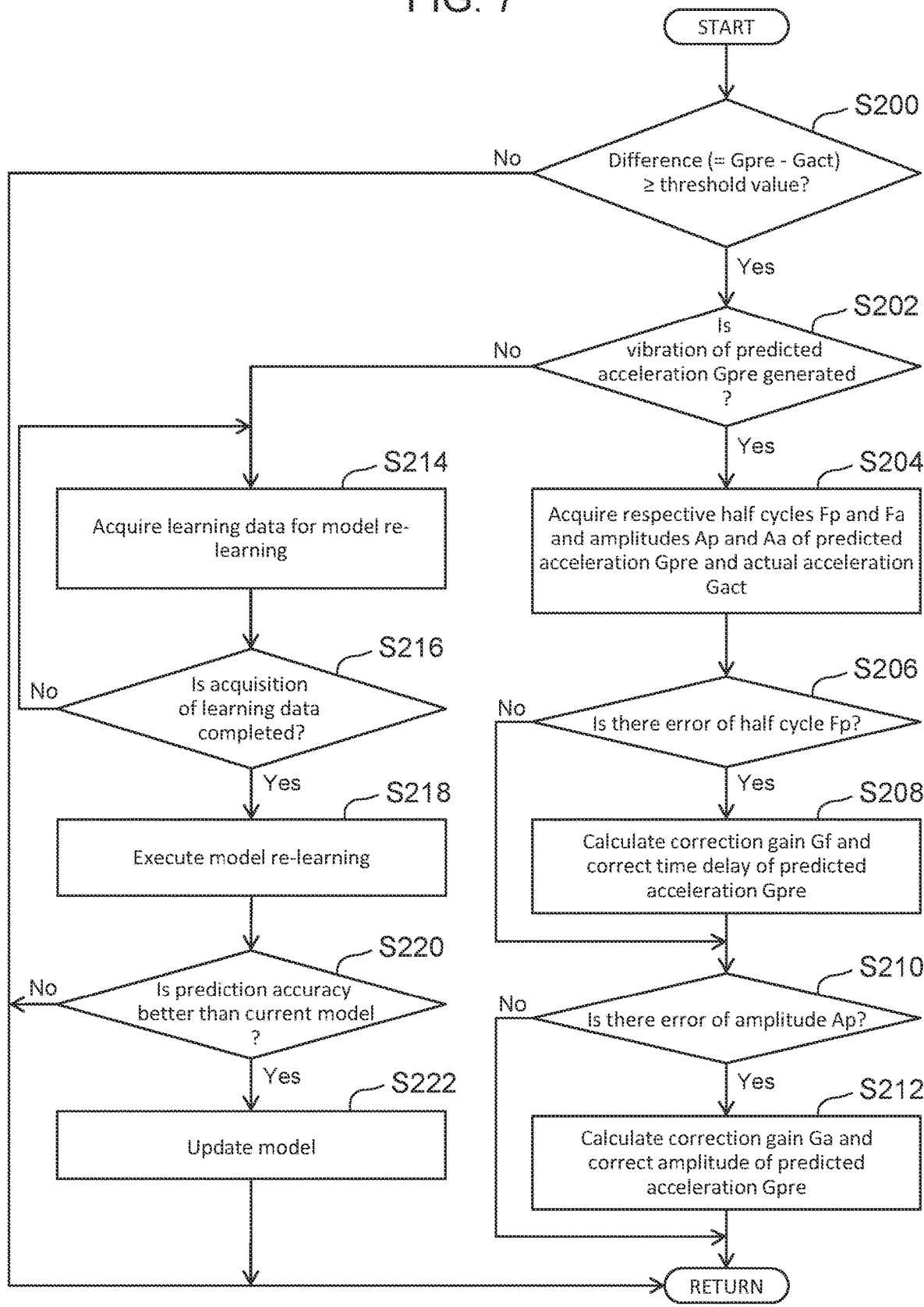
FIG. 7 is a flowchart illustrating an example of the flow of processing relating to a model correction unit and a model re-learning unit shown in FIG. 6.

FIG. 7 is a flowchart illustrating an example of the flow of processing relating to the model correction unit 52 and the model re-learning unit 50a shown in FIG. 6. The processing of this flowchart is repeatedly executed during execution of the vehicle drive torque control (i.e., in parallel with the processing of the flowchart shown in FIG. 3). It should be noted that the following description is given by taking acceleration as an example, but the same applies to the processing executed at the time of deceleration.

In FIG. 7, first, in step S200, the ECU 30 (processor 30a) determines whether or not the difference (i.e., prediction error) in the predicted acceleration Gpre with respect to the actual acceleration Gact is equal to or greater than a designated threshold value. More specifically, this determination is performed, for example, using the waveforms (time series data) of the actual acceleration Gact and the predicted acceleration Gpre in a designated determination period td.

Figure 8:
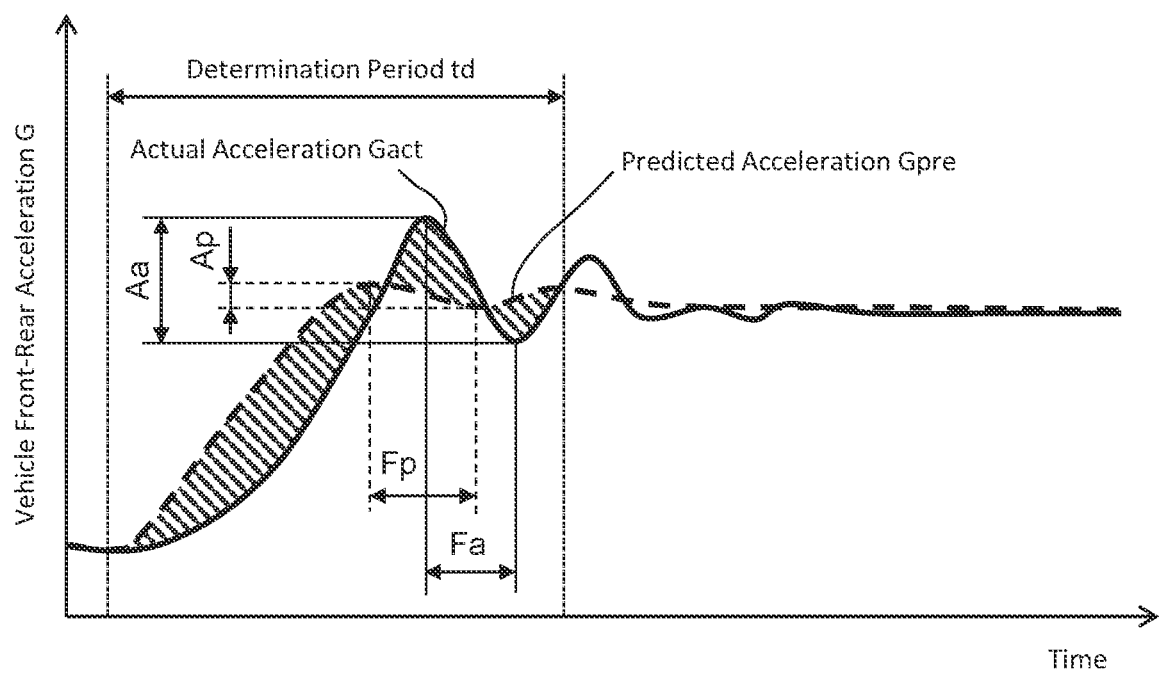
FIG. 8 is a timing chart used to describe an example of the determination method of step S200 in FIG. 7.

FIG. 8 is a timing chart used to describe an example of the determination method of step S200 in FIG. 7. FIG. 8 shows a situation in which a difference occurs between the actual acceleration Gact (solid line) and the predicted acceleration Gpre (broken line) at the time of acceleration of the vehicle 100. In FIG. 8, "Aa" and "Ap" are the amplitudes of the actual acceleration Gact and the predicted acceleration Gpre, respectively. Also, "Fa" and "Fp" are the half cycles of the vibrations of the actual acceleration Gact and the predicted acceleration Gpre, respectively. As an example, the determination period td is the same as the above-described prediction period tp used in the drive force optimizer 40. However, the determination period td may be a designated period longer than the prediction period tp. When the determination period td is set to be longer than the prediction period tp, the time series data of the predicted acceleration Gpre for the determination period td may be calculated using the acceleration prediction model 50 to determine the prediction error in this step S200.

In step S200, as shown in FIG. 8, the ECU 30 calculates, as the above-described prediction error, the area (integral value) of the region surrounded between the waveform of the actual acceleration Gact and the waveform of the predicted acceleration Gpre in the designated determination period td. Then, the ECU 30 determines whether or not the calculated prediction error is equal to or greater than a threshold value. This threshold value is preset, for example, as a value equivalent to the minimum value of acceleration that can be perceived by a person in the vehicle 100.

When, in step S200, the calculated prediction error is less than the threshold value (i.e., when the prediction error is smaller than the acceleration that can be perceived by a person), the ECU 30 ends the current processing cycle. When, on the other hand, the calculated prediction error is equal to or greater than the threshold value, the processing proceeds to step S202.

In step S202, the ECU 30 determines whether or not vibration is generated in the wave form of the predicted acceleration Gpre. This determination can be made, for example, based on whether or not the amplitude Ap of the waveform of the predicted acceleration Gpre after the start of the acceleration (e.g., see FIG. 8) is equal to or greater than a designated threshold value.

When the determination result of step S202 is positive (i.e., when vibration is generated as in the example of the waveform of the predicted acceleration Gpre shown in FIG. 8), the processing proceeds to step S204. In step S204, the ECU 30 acquires the half cycles Fp and Fa and the amplitudes Ap and Aa for each of the waveforms of the predicted acceleration Gpre and the actual acceleration Gact. In addition, the amplitude Ap is the same as that acquired in step S202.

In step S206 following step S204, the ECU 30 determines whether or not there is an error of the half cycle Fp of the predicted acceleration Gpre with respect to the half cycle Fa of the actual acceleration Gact (i.e., a time delay of the waveform of the predicted acceleration Gpre with respect to the waveform of the actual acceleration Gact). This determination can be made based on, for example, whether or not the absolute value of the difference between the half cycle Fa and the half cycle Fp is equal to or greater than a designated threshold value. As a result, when there is an error of the half cycle Fp, the processing proceeds to step S208. When, on the other hand, there is no error of the half cycle Fp, the processing proceeds to step S210.

In step S208, the ECU 30 calculates a correction gain Gf for correcting the time delay of the waveform of the predicted acceleration Gpre with respect to the waveform of the actual acceleration Gact, and corrects the time delay of the predicted acceleration Gpre. This correction gain Gf is calculated based on the half cycle Fa. For example, the ECU 30 uses the values of the half cycles Fa and Fp acquired in step S204 to calculate, as the correction gain Gf, a value acquired by dividing the half cycle Fa by the half cycle Fp.

Figure 9A:
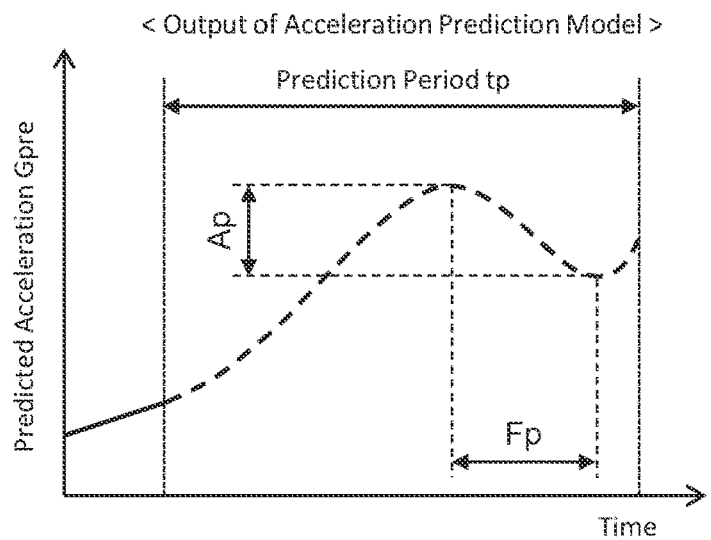
FIG. 9A is a diagram used to describe an example of the method of correcting a time delay and the amplitude of predicted acceleration Gpre by the model correction unit shown in FIG. 6.
Figure 9B:
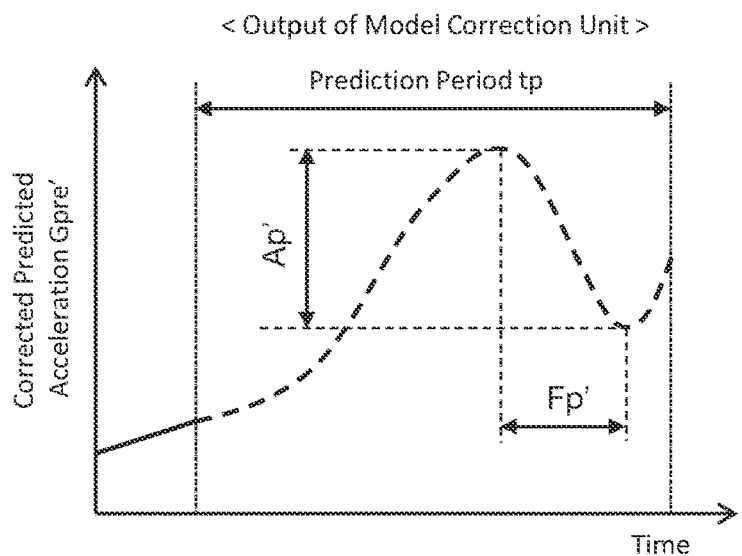
FIG. 9B is a diagram used to describe an example of the method of correcting a time delay and the amplitude of predicted acceleration Gpre by the model correction unit shown in FIG. 6.

FIG. 9A and FIG. 9B are diagrams used to describe an example of the method of correcting the time delay and the amplitude of the predicted acceleration Gpre by the model correction unit 52 shown in FIG. 6. FIG. 9A shows a waveform of the predicted acceleration Gpre which is the output of the acceleration prediction model 50 (i.e., a waveform before the correction by the model correction unit 52). FIG. 9B shows a waveform of the predicted acceleration Gpre' after the correction by the model correction unit 52. In the example shown in FIG. 9B, both the time delay and the amplitude are corrected.

In step S208, the ECU 30 calculates the correction gain Gf as described above, and then corrects the time delay of the waveform of the predicted acceleration Gpre by reflecting the calculated correction gain Gf to the waveform (time series data) of the predicted acceleration Gpre before the correction. Specifically, the correction gain Gf is multiplied by the predicted acceleration Gpre which is before the correction and outputted from the acceleration prediction model 50. As a result, the half cycle Fp of the waveform of the predicted acceleration Gpre, which is the output of the acceleration prediction model 50, is corrected as a half cycle Fp' shown in FIG. 9B. The correction of the time delay using this kind of correction gain Gf is continuously reflected to the predicted acceleration Gpre outputted from the acceleration prediction model 50 after the correction gain Gf is calculated.

In step S210 following step S208, the ECU 30 determines whether or not there is an error of the amplitude Ap of the predicted acceleration Gpre with respect to the amplitude Aa of the actual acceleration Gact. This determination can be made based on, for example, whether or not the absolute value of the difference between the amplitude Aa and the amplitude Ap is equal to or greater than a designated threshold value. As a result, when there is an error of the magnitude Ap, the processing proceeds to step S212. When, on the other hand, there is no error in the amplitude Ap, the ECU 30 ends the current processing cycle.

In step S212, the ECU 30 calculates a correction gain Ga for correcting an error of the amplitude Ap of the waveform of the predicted acceleration Gpre with respect to the waveform of the actual acceleration Gact, and then corrects the error of the amplitude Ap of the predicted acceleration Gpre. This correction gain Ga is calculated based on the amplitude Aa. For example, the ECU 30 uses the values of the amplitudes Aa and Ap acquired in step S204 to calculate, as the correction gain Ga, a value acquired by dividing the amplitude Aa by the amplitude Ap.

In step S212, the ECU 30 calculates the correction gain Ga as described above, and then corrects the amplitude Ap by reflecting the calculated correction gain Ga to the waveform (time series data) of the predicted acceleration Gpre before the correction. Specifically, the correction gain Ga is multiplied by the predicted acceleration Gpre which is before the correction and outputted from the acceleration prediction model 50. As a result, the amplitude Ap of the waveform of the predicted acceleration Gpre, which is the output from the acceleration prediction model 50, is corrected as an amplitude Ap' shown in FIG. 9B. The correction of the amplitude Ap using this kind of correction gain Ga is continuously reflected to the predicted acceleration Gpre outputted from the acceleration prediction model 50 after the correction gain Ga is calculated.

Additionally, the processing of steps S200 to S212 in FIG. 7 corresponds to an example of the "acceleration correction process" according to the present disclosure.

Figure 10:
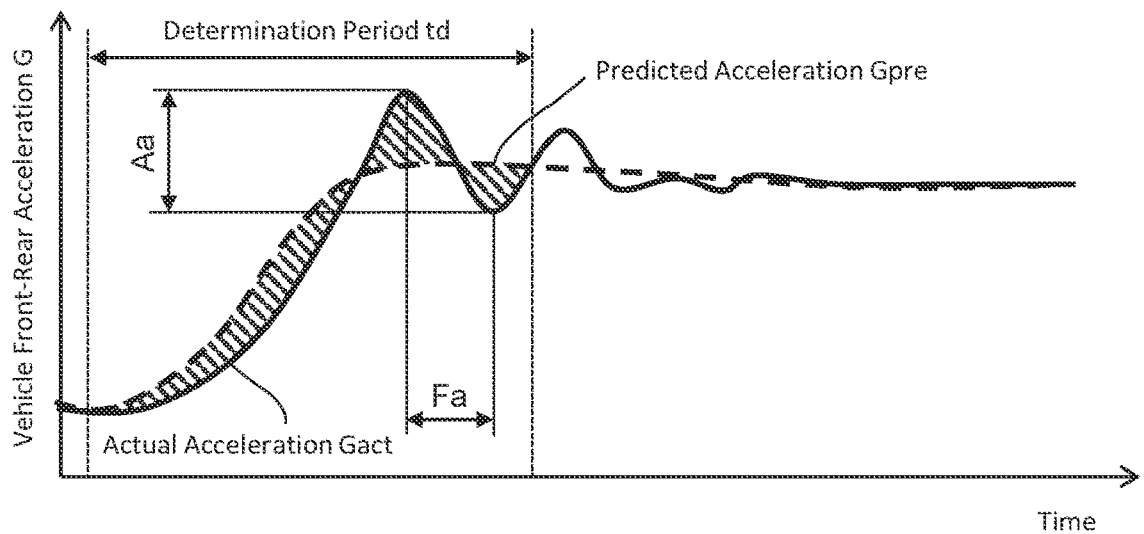
FIG. 10 is a time chart illustrating an example of the waveforms of the predicted acceleration Gpre and the actual acceleration Gact in a condition in which re-learning of the predicted acceleration Gpre is performed by the model re-learning unit 50a shown in FIG. 6.

Then, FIG. 10 is a time chart illustrating an example of the waveforms of the predicted acceleration Gpre and the actual acceleration Gact in a condition in which re-learning of the predicted acceleration Gpre is performed by the model re-learning unit 50a shown in FIG. 6. In the waveform of the predicted acceleration Gpre in the example shown in FIG. 10, similarly to the waveform of the predicted acceleration Gpre shown in FIG. 8, the error of the predicted acceleration Gpre with respect to the actual acceleration Gact in the determination period td (i.e., the prediction error) is equal to or greater than the threshold value (see step S200). However, no vibration is generated in the waveform of this predicted acceleration Gpre. When the vibration is not generated in this way, the correction by the model correction unit 52 cannot be performed. As a result, the determination result of step S202 becomes negative, and the processing proceeds to step S214.

In step S214, the ECU 30 acquires learning data, which is used for the re-learning of the acceleration prediction model 50, at the time of acceleration (and deceleration) that arrives after the proceeding proceeds to step S214. Specifically, the learning data is a combination of "time series data of the command torque Tpcm and one or more variables x, which are explanatory variables (i.e., the inputs)" and "time series data of the vehicle front-rear acceleration G (more specifically, the actual vehicle front-rear acceleration Gact), which is an objective variable (i.e., the output)", similar to that used in the learning performed in advance.

In step S216 following step S214, the ECU 30 determines whether or not the acquisition of a designated number of pieces of learning data sufficient to re-learn the acceleration prediction models 50 is completed. As a result, when the acquisition of the designated number of pieces of learning data is completed, the processing proceeds to step S218.

In step S218, the ECU 30 uses the acquired learning data to execute the re-learning of the acceleration prediction models 50. Specifically, in step S218, the ECU 30 creates a copy of the acceleration prediction model 50 before the re-learning, and then stores the copy in the storage device 30b. Then, the ECU 30 feeds the learning data to the copied acceleration prediction model (for convenience of explanation, referred to as an "acceleration prediction model C") and then executes the learning of the acceleration prediction model C. It should be noted that the learning of the acceleration prediction model C may be executed using the learning data acquired in step S214 together with the old learning data used for the learning in advance, or may be executed without using the old learning data.

In step S220 following step S218, the ECU 30 determines whether or not the calculation accuracy of the predicted acceleration Gpre by the acceleration prediction model C is higher than that of the current acceleration prediction model 50. Specifically, this determination can be performed, for example, as follows. That is, at the time of acceleration of the vehicle 100 that arrives after the learning of the acceleration prediction model C is completed, the ECU 30 uses each of the two acceleration prediction models 50 and C to calculate a prediction error of the predicted acceleration Gpre by the same processing as in step S200. Then, the ECU 30 determines whether or not the prediction error of the acceleration prediction model C is smaller than the prediction error of the current acceleration prediction model 50.

When the prediction accuracy of the acceleration prediction model C is better than the prediction accuracy of the current acceleration prediction model 50 in step S220, the processing proceeds to step S222. In step S222, the ECU 30 deletes the current acceleration prediction model 50 and then updates the acceleration prediction model 50 by the acceleration prediction model C. When, on the other hand, the prediction accuracy of the current acceleration prediction model 50 is better than the prediction accuracy of the acceleration prediction model C in step S220, the ECU 30 ends the current processing cycle (i.e., does not update the acceleration prediction model 50) while deleting the acceleration prediction model C.

As described above, the control structure of the vehicle drive torque according to the second embodiment additionally includes the model correction unit 52. As a result, when, for example, the accuracy of the predicted acceleration Gpre is not good due to the individual difference of the vehicle 100 on which the acceleration prediction model 50 is mounted, the prediction accuracy can be ensured by using the model correction unit 52.

Furthermore, the acceleration prediction model 50 according to the second embodiment has the model re-learning unit 50a. Therefore, even when the correction by the model correction unit 52 cannot be executed because the vibration is not generated in the waveform of the predicted acceleration Gpre, the prediction accuracy can be ensured by using the model re-learning unit 50a.

In addition, the ECU 30 may proceed to the processing of step S202 when a determination result that the prediction error of the predicted acceleration Gpre is equal to or greater than a designated threshold value is continuously acquired a designated number of times in the processing of step S200 shown in FIG. 7. As a result, when a continuous prediction error is generated in the predicted acceleration Gpre, the ECU 30 can ensure the prediction accuracy by using the model correction unit 52 or the model re-learning unit 50a.

What is claimed is:

1. A control device for controlling, based on an operating state of a vehicle, a vehicle drive unit having one or more power sources, the control device comprising:
a processor; and
a storage device configured to store a vehicle front-rear acceleration prediction model being a machine learning model that receives as an input a command torque, which is a vehicle drive torque commanded to the vehicle drive unit, and outputs predicted acceleration, which is a predicted value of vehicle front-rear acceleration, wherein
the processor is configured to:
execute a predicted acceleration calculation process to calculate the predicted acceleration using the vehicle front-rear acceleration prediction model; and
execute a command torque calculation process to calculate the command torque that minimizes an evaluation function, the evaluation function minimizing a deviation of the predicted acceleration with respect to a target vehicle front-rear acceleration according to a target torque being a target value of the vehicle drive torque based on the operating state while reducing a deviation of the command torque with respect to the target torque.

2. The control device according to claim 1, wherein
the processor is configured to further execute an acceleration correction process to correct the predicted acceleration outputted from the vehicle front-rear acceleration prediction model, based on a difference of the predicted acceleration with respect to actual vehicle front-rear acceleration generated when the vehicle drive torque according to the command torque is outputted from the vehicle drive unit.

3. The control device according to claim 1, wherein
the processor is configured to execute the predicted acceleration calculation process and the command torque calculation process for each time step for data of the target torque, the command torque, the target vehicle front-rear acceleration, and the predicted acceleration at a plurality of time steps included in a prediction period being a designated period from a current time step.

4. The control device according to claim 3, wherein
the prediction period is a minimum period to predict at least one of vibration of actual vehicle front-rear acceleration caused by a torsion of a drive shaft of the vehicle and vibration of the actual vehicle front-rear acceleration caused by elimination of backlash of gears located in a power transmission path from the one or more power sources to the drive shaft.

5. The control device according to claim 4, wherein the processor is configured to cause the target torque at each of the plurality of time steps included in the prediction period to be constant at a value of the target torque at the current time step.

6. A control method of controlling, based on an operating state of a vehicle, a vehicle drive unit having one or more power sources, the control method comprising:
  a predicted acceleration calculation process to calculate a predicted acceleration, which is a predicted value of vehicle front-rear acceleration, using a vehicle front-rear acceleration prediction model being a machine learning model that receives as an input a command torque, which is a vehicle drive torque commanded to the vehicle drive unit, and outputs the predicted acceleration; and
  a command torque calculation process to calculate the command torque that minimizes an evaluation function, the evaluation function minimizing a deviation of the predicted acceleration with respect to a target vehicle front-rear acceleration according to a target torque being a target value of the vehicle drive torque based on the operating state while reducing a deviation of the command torque with respect to the target torque.

7. The control method according to claim 6, further comprising an acceleration correction process to correct the predicted acceleration outputted from the vehicle front-rear acceleration prediction model, based on a difference of the predicted acceleration with respect to actual vehicle front-rear acceleration generated when the vehicle drive torque according to the command torque is outputted from the vehicle drive unit.

8. The control method according to claim 6, further comprising executing the predicted acceleration calculation process and the command torque calculation process for each time step for data of the target torque, the command torque, the target vehicle front-rear acceleration, and the predicted acceleration at a plurality of time steps included in a prediction period being a designated period from a current time step.

9. The control method according to claim 8, wherein
  the prediction period is a minimum period to predict at least one of vibration of actual vehicle front-rear acceleration caused by a torsion of a drive shaft of the vehicle and vibration of the actual vehicle front-rear acceleration caused by elimination of backlash of gears located in a power transmission path from the one or more power sources to the drive shaft.

10. The control method according to claim 9, further comprising causing the target torque at each of the plurality of time steps included in the prediction period to be constant at a value of the target torque at the current time step.

* * * * *